(12) United States Patent
Shepherd et al.

(10) Patent No.: US 8,874,540 B2
(45) Date of Patent: *Oct. 28, 2014

(54) METHOD FOR SEMANTIC CLASSIFICATION OF NUMERIC DATA SETS

(75) Inventors: Michael David Shepherd, Ontario, NY (US); Dale Ellen Gaucas, Penfield, NY (US); Kirk J. Ocke, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 401 days.

This patent is subject to a terminal disclaimer.

(21) Appl. No.: 13/226,696

(22) Filed: Sep. 7, 2011

(65) Prior Publication Data

US 2013/0060774 A1    Mar. 7, 2013

(51) Int. Cl.
G06F 17/30    (2006.01)
G06Q 30/02    (2012.01)

(52) U.S. Cl.
CPC .................................. *G06Q 30/0271* (2013.01)
USPC ............ 707/706; 707/709; 704/242; 704/270

(58) Field of Classification Search
CPC .............. G06F 17/30; G06F 17/30327; G06F 17/30401; G06F 3/0482; G06F 9/30123; G06F 17/274; G06F 17/30389; G06F 17/30616; G06F 17/30864

USPC .......................... 707/706, 769; 704/242, 270
See application file for complete search history.

(56) References Cited

U.S. PATENT DOCUMENTS

2010/0268536 A1*   10/2010   Suendermann et al. ...... 704/243
2011/0153582 A1*   6/2011    Buchmann et al. ........... 707/706

OTHER PUBLICATIONS

U.S. Appl. No. 12/857,997, filed Aug. 17, 2010 entitled "Semantic Classification of Variable Data Campaign Information."
U.S. Appl. No. 12/858,168, filed Aug. 17, 2010 entitled "Open Class Noun Classification."
U.S. Appl. No. 13/211,437, filed Aug. 17, 2011 entitled "Knowledge-Based System and Method for Capturing Campaign Intent to Ease Creation of Complex VDP Marketing Campaigns".
Thesis by Varish Mulwad, entitled T2LD—An automatic framework for extracting, interpreting and representing tables as Linked Data, Aug. 2010, including paragraph 3.5.1.

* cited by examiner

*Primary Examiner* — Yicun Wu
(74) *Attorney, Agent, or Firm* — Fay Sharpe LLP (57) ABSTRACT

A system and method for semantically classifying numerical data includes using semantic classification techniques on 'nearby' non-numerical data to identify a context whereby opaque data sets of numbers can be semantically classified inside of that context. An Electronic Knowledge Base is used to query against the context and determine the semantics of the opaque numeric data sets.

20 Claims, 7 Drawing Sheets

| | |
|---|---|
| dbpedia2:julSnowCm | 0 |
| dbpedia2:junSnowCm | 0 |
| dbpedia2:maySnowCm | 0 |
| dbpedia2:aprSnowCm | 3.5 |
| dbpedia2:marSnowCm | 21.4 |
| dbpedia2:febSnowCm | 21.8 |
| dbpedia2:janSnowCm | 14.1 |
| dbpedia:ontology/populationUrbanDensity | 3072.25 |
| dbpedia:ontology/areaTotal | 454030000 |
| dbpedia:ontology/leaderName | :Fabian_Stang |
| dbpedia:ontology/areaMetro | 9445030000 |
| dbpedia:ontology/populationDensity | 1277.97 |
| dbpedia:ontology/postalCode | "0301"@en |
| dbpedia:ontology/areaUrban | 285260000 |
| dbpedia:ontology/leaderTitle | "Mayor"@en |
| dbpedia:ontology/populationTotal | 586860 |
| dbpedia:ontology/populationMetro | 1403268 |
| dbpedia:ontology/populationUrban | 876391 |
| dbpedia:ontology/populationMetroDensity | 148.57 |
| foaf:name | "Oslo"@en |
| foaf:page | <http://en.wikipedia.org/wiki/Oslo> |

FIG. 7

METHOD FOR SEMANTIC CLASSIFICATION OF NUMERIC DATA SETS

RELATED APPLICATIONS

The disclosures of related U.S. patent application Ser. No. 13/211,437 filed on Aug. 17, 2011, and U.S. patent application Ser. No. 12/858,168 filed on Aug. 17, 2010, are hereby incorporated herein by reference in their entirety.

TECHNICAL FIELD

The presently disclosed embodiments are directed toward methods and systems for generating a marketing campaign. More particularly, the teachings disclosed herein are applicable to methods and apparatuses for generating data sources for use when generating a marketing campaign. It will be appreciated that the described systems and methods may find application in other fields.

BACKGROUND

Data suggests that somewhere between 30-40% of marketing campaigns are personalized, most of which only vary content based on the recipient's name. First-name and last-name are simple textual data values that can be leveraged in a limited capacity on a personalized document (e.g., embedded in textual message or in an image). As CRM (customer relations management) systems become more sophisticated, much more data becomes available in which campaigns can be personalized for customers or prospects. The data (e.g. first-name, last-name, age, gender) and logic (a.k.a "business rules"—e.g. "if gender is male and age is less than 30, then special offer=iPhone otherwise special offer=Blackberry) aspects of a variable data publishing (VDP) plan creation are difficult and time consuming.

In some instances, large amounts of data are available for use in creating a VDP plan, but the data is incomplete or lacks context to make it useful and/or easily incorporated into a VDP plan. An example of such data is a large spreadsheet or database wherein at least some of the columns of data do not have a label identifying the column of data, or some of the properties of some of the data is unknown.

There is a need in the art for systems and methods that facilitate utilization of data sources that contain useful information but may be incomplete or lacking context while overcoming the aforementioned deficiencies.

BRIEF DESCRIPTION

In accordance with one aspect, a method of semantically classifying numeric data of a data source including numeric data sets and non-numeric data sets, the method comprises i) loading, by a processing device, a data source comprising numeric data and non-numeric data from a computer readable medium operably connected to the processing device, ii) extracting, by the processing device, one or more open class nouns from at least one non-numeric data set of the data source, the one or more open class nouns being in a proximity to the numeric data set of the data source, iii) determining, by the processing device, at least one semantic classification for the non-numeric data set of the data source using a semantic classification technique, iv) extracting, by the processing device, one or more number values from at least one numeric data set of the data source, v) querying, by the processing device, an Electronic Knowledge Base (EKB) to determine if the semantic classification for the non-numeric data set and one or more number values of the numeric data set exist in the EKB and, if so, querying the EKB based on the at least one semantic classification of the non-numeric data set and one or more number values of the numeric data set to retrieve one or more results corresponding to each of the number values of the numeric data set, the one or more results including a property and a value, vi) comparing, by the processing device, each value returned by the EKB against a corresponding number value from the numerical data set, vii) applying an acceptable tolerance in which to consider a respective value returned from the EKB to match a respective number value of the numerical data set, viii) deriving, by the processing device, a confidence score for the numeric data set based on the one or more results, and ix) determining, by the processing device, at least one classification for the numerical data set based on the confidence score.

The method can further comprise analyzing the one or more classifications for each open class noun in the data set based upon the one or more results, and determining the confidence score based upon a combination of the one or more classifications for each open class noun. The data source can include columns of data, and the extracting one or more open class nouns from the non-numeric data set of the data source can include extracting an entire column of non-numeric data from the data source. The data source can include columns of data, and the extracting one or more number values from the numeric data set of the data source can include extracting an entire column of numeric data from the data source. The data source can include at least one of product information, geographical information, climate information, or business information. The data source can include a plurality of columns of data with each column representing a data set, at least one of the columns containing non-numeric data, and at least one of the columns including numeric data. The non-numerical data set and the numerical data set can be proximally located within the same data source. The method can include utilizing the at least one classification for the numerical data set to semantically classify additional numeric data sets. A processor can be configured to execute computer-executable instructions for performing the method, the instructions being stored on a computer-readable medium.

In accordance with another aspect, a system that semantically classifies numeric data of a data source including numeric data sets and non-numeric data sets, comprises a processing device, and a computer readable medium in communication with the processing device. The computer readable medium comprises one or more programming instructions that, when executed, cause the processing device to i) load a data source comprising numeric data and non-numeric data from a computer readable medium operably connected to the processing device, ii) extract one or more open class nouns from at least one non-numeric data set of the data source, the one or more open class nouns being in a proximity to the numeric data set of the data source, iii) determine at least one semantic classification for the non-numeric data set of the data source using a semantic classification technique, iv) extract one or more number values from at least one numeric data set of the data source, v) query an EKB to determine if the semantic classification for the non-numeric data set and one or more number values of the numeric data set exist in the EKB and, if so, query the EKB based on the at least one semantic classification of the non-numeric data set and one or more number values of the numeric data set to retrieve one or more results corresponding to each of the number values of the numeric data set, the one or more results including a property and a value, vi) compare each value returned by the EKB against a corresponding number value from the numerical data set, vii) apply an acceptable tolerance in which to consider a respective value returned from the EKB to match a respective number value of the numerical data set, viii) derive a confidence score for the numeric data set based on the one or more results, and ix) determine at least one classification for the numerical data set based on the confidence score.

The one or more programming instructions for deriving the confidence score can further comprise one or more programming instructions that, when executed, cause the processing device to, analyze the one or more classifications for each numeric value in the data set based upon the one or more results, and determine the confidence score for the numeric data set based upon a combination of the one or more classifications for each numeric value. The data source can include at least one of product information, geographical information, climate information, or business information. The data source can include at least one of a database, a spreadsheet, or a linked list.

In accordance with another aspect, a method of semantically classifying a data set of numeric values contained in a data source having at least one non-numeric data set comprises loading, by a processing device, a non-numeric data set comprising one or more non-numeric values, processing, by the processing device, the non-numeric data set to determine one or more classifications of the non-numeric data set, extracting, by the processing device, the numeric data set, querying, by the processing device, at least one EKB to determine if the one or more classifications and at least one numeric value of the numeric data set are known to the EKB and, if so, querying, by the processing device, the EKB for return of results relating to the one or more classifications, receiving, by the processing device, from the EKB at least a property and a value associated with each result, and determining, by the processing device at least one classification for the numeric data set based on at least a property and a value received from the EKB.

The method can further comprise applying an acceptable tolerance in which to consider a value returned from the EKB to match a numeric value of the numerical value set. The acceptable tolerance can be within plus or minus 10% of the numeric value. The determining can include deriving a confidence score based upon a combination of one or more properties and values returned from the EKB. The data source can include at least one of product information, geographical information, climate information, or business information. A processor can be configured to execute computer-executable instructions for performing the method, the instructions being stored on a computer-readable medium.

DETAILED DESCRIPTION

Highly personalized marketing can be significantly more successful by making the most effective use of customer data for creating an exceptional personalized experience, whether acquiring new customers or retaining and up-selling existing customers. The potential complexity of personalization grows with the amount of data resources accessible by the MSP. Thereby the logic involved in driving a personalized campaign can become very complicated. Larger available data sources cause complexity to grow in two directions: first, the implicit knowledge that can be derived from the explicit data in the data source; and second, the number and quality of decisions needed to be made based on the implicit and explicit data in order to create the highly personalized document.

As CRM systems become more sophisticated, they will not only incorporate more customer static and historical data, but will also be able to learn much more about a customer or prospect via web queries, real-time data, and interaction with online social media, as well as targeting via psychographics. As more customer data, both explicit and implicit, becomes available, there will emerge a need to express the logic of a marketing campaign using more robust automated knowledge techniques. As a result, many campaigns may be prone to either ignoring marketing opportunities hidden in the data due to the complexity of mining the data (resulting in less-effective campaigns) or requiring highly skilled database programming experts (resulting in high campaign costs). The subject innovation provides systems and methods that facilitate meeting the above-described needs in order to take advantage of more complex data and to improve marketing campaign personalization.

Figure 1:
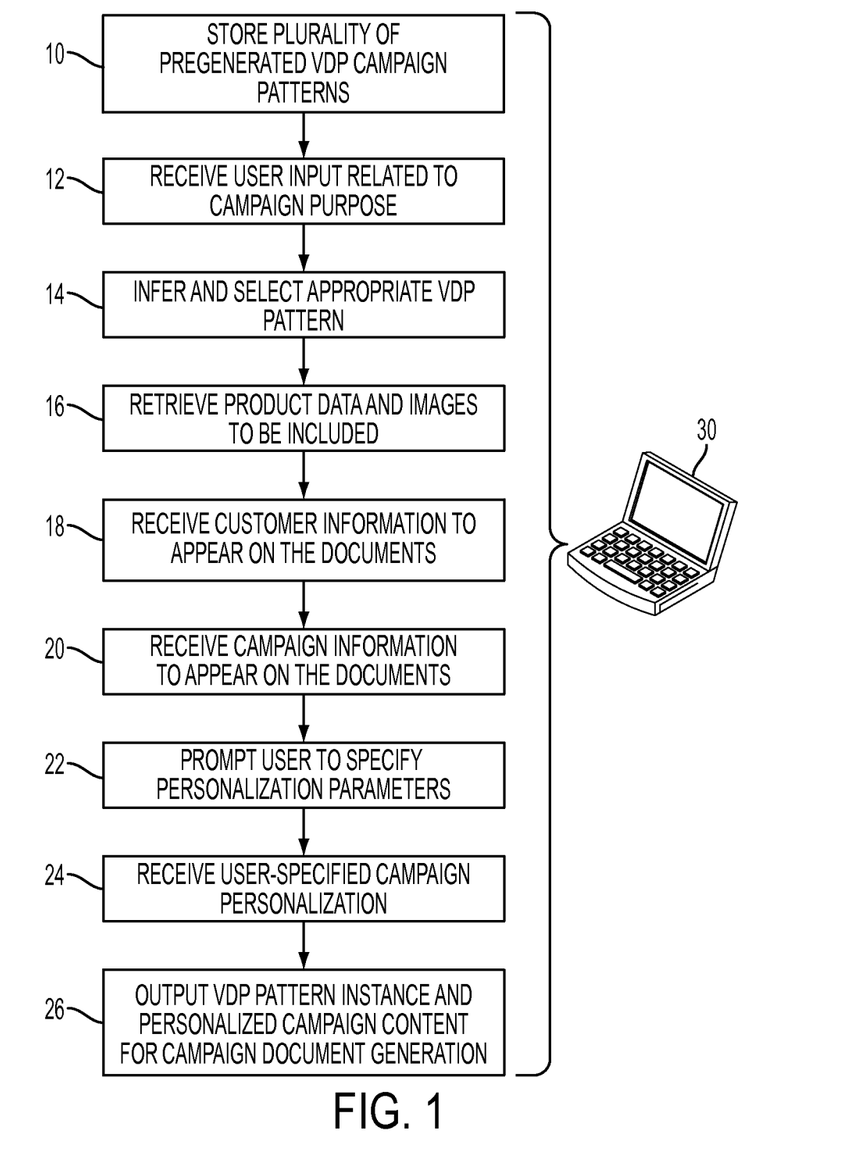
FIG. 1 illustrates a method for identifying campaign designer intent in which a VDP non-expert user can express the desired VDP logic for a personalized marketing campaign.

FIG. 1 illustrates a method for identifying campaign designer intent in which a VDP non-expert user, also referred to herein as a "campaign designer," can express the desired VDP logic for a personalized marketing campaign. Accordingly, at 10, a plurality of pre-generated campaign patterns are stored (e.g., in a memory, computer-readable medium, etc.). These campaign patterns are hereafter referred to as "VDP Patterns." Types of VDP Patterns include, without being limited to, Product Offer, Advertisement, Solicitation, Invitation, Announcement, Recall, Reminder, Survey, Greeting Card, Itinerary, etc. Additionally, each VDP Pattern is semantically defined and represented to contain VDP elements specific to that VDP Pattern. "VDP elements" denote high-level concepts that are typically populated by variable content. At 12, user input is received, which describes a campaign purpose (e.g., a sale, incentive, service, etc.). At 14, an appropriate VDP pattern is inferred based on the user's indicated campaign purpose and selected for populating with user-provided recipient-specific information. At 16, existing data and images to be used in the VDP pattern are received. The existing data and images can be entered (e.g., downloaded) by the campaign designer and/or can be selected from a database of stored images and/or data.

At 18, customer information to appear on the campaign documents is received. For instance, the designer can download or import customer data from a source, such as a spreadsheet or the like. At 20, campaign information to appear in the document(s) is received. Campaign information may include, for instance, a coupon or reward, a sale data and location, or any other information the designer wishes to disseminate to one or more customers. At 22, the user is prompted to specify personalization parameters for the campaign. User prompts are a function of the selected VDP pattern, which in turn has been selected as a function of the user's specified campaign intent. At 24, user-specified campaign personalization is performed. For instance, a user may wish to personalize the VDP pattern to include variable data such as name, nearest store to the named customer, and coupon size (e.g., which may be a function of an amount the named customer spent at the store in a previous time period or the like). At 26, the personalized VDP pattern and campaign content are output (e.g., on a graphical user interface, via a print-out, via email, or some other suitable means) for review and verification and for generating the campaign documents (e.g., personalized emails, post cards, mailers, web-based advertisements, etc.).

It will be appreciated that the method of FIG. 1 can be implemented by a computer 30, which comprises a processor (such as the processor 202 of FIG. 4) that executes, and a memory (such as the memory 204 of FIG. 4) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 4), a system memory (see, e.g., FIG. 4), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
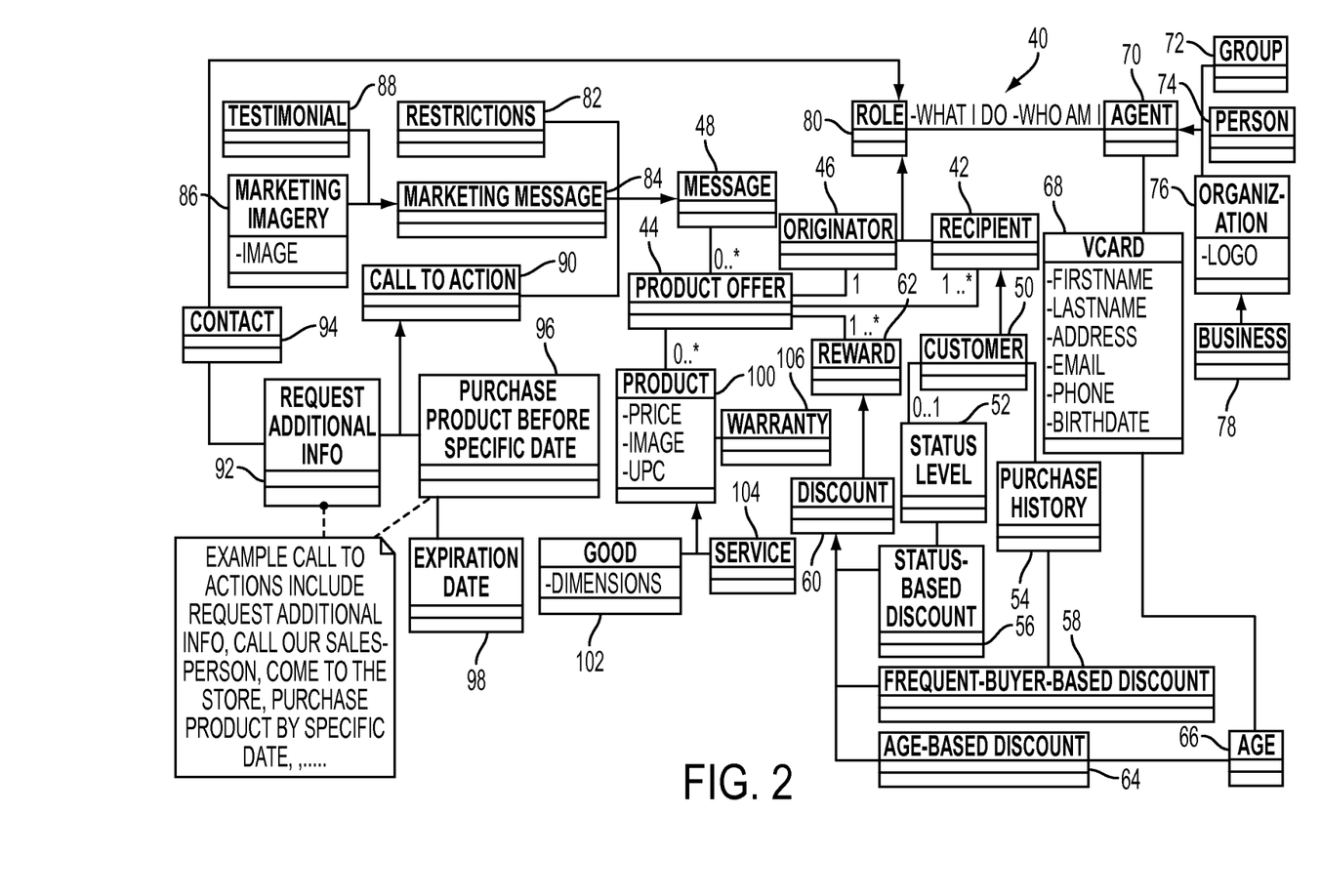
FIG. 2 shows an example VDP Pattern called "Product Offer."

FIG. 2 shows an example VDP Pattern 40 called "Product Offer." The surrounding boxes are the supporting VDP elements. "Element" as used herein denotes both a computer-readable medium or portion thereof that stores information, as well as a populatable and personalizable field into which the information may be entered by a user. For instance, a user may enter information into a given field presented to the user on a graphical user interface, and/or the information may be downloaded or extracted from an electronic document or source and automatically entered into appropriate fields. Once entered, the information is then stored at a predefined location in a system memory. Although the herein-described knowledge-base has in-depth knowledge of the relationships between elements, the system and method defined herein uses the VDP concepts most directly related to the specific VDP Pattern for illustrative purposes. Some VDP elements are shared across many VDP Patterns. For instance, every VDP Pattern, by the definition of VDP campaign, has a recipient element 42. As another example, Offers, Recalls, and Warranty Extensions typically all share the Product element 44. Different campaigns can use different VDP elements of the VDP Patterns. In one embodiment, some elements may be mandatory while others may be optional.

The VDP pattern 40 also includes an originator element 46 that originates the offer or marketing campaign, as well as a message element 48 that includes a message for the recipient. The recipient may be a customer of the campaign designer (e.g., a merchant), and therefore the pattern 40 includes a customer element 50. Each customer has a status level 52 and a purchase history 54, which can be analyzed to generate a status-based discount 56 and/or a frequent-buy-based discount 58. Information from the status-based discount element 56 and/or the frequent-buyer-based discount element 58 is provided to a discount element 60, which in turn provides information to a reward element 62 that generates a reward for inclusion in the product offer 44. An age-based discount element 64 can provide age-based discount information to the discount element 60. A customer's age 66 is stored or determined by an age element 66, such as by analyzing or storing a vcard 68 or the like.

The VDP pattern 40 also includes elements associated with an agent who can help the campaign designer design the marketing campaign. For instance, an agent element 70 comprises information regarding the identity of the agent, which may be collected from a group element 72 that identifies multiple agents, from a person element 74 that identifies a single agent, and/or from an organization element 76 that identifies an organization that acts as an agent. A business element 78 includes information related to the business of the organization acting as an agent. The agent element has is populated with a desired level of information describing the identity of the agent, and is associated with a role element 80 that includes information related to one of more functions or services provided by the agent.

The message element 48 can include one or more message types such as one or more restrictions on the product offer, which are stored in a restrictions element 82. The message may also include a marketing message that is stored in a marketing message element 84. The marketing message may include marketing imagery obtained from a marketing imagery element 86 that stores images, as well as testimonial information (i.e., testimonials for satisfied customers or the like) that are stored in a testimonial element 88. Additionally, the message 48 can include one or more calls to action that are stored in a call to action element 90. In one example, the call to action includes a request for additional information 92, in which case a contact element 94 is executed to contact either the recipient of the product offer or an agent (e.g., via the role element 80) who then contacts the recipient. In another example, the call to action includes an offer deadline, e.g., stored in a "purchase product before specific date" element 96. The deadline information for a given product offer is stored in an expiration date element 98.

The product offer 44 may also include product information, which is stored in a product element 100, and which may include, without limitation, one or more of product price, an image of the product, UPC information for the product, etc. A good element 102 includes product information for one or more goods, such as dimension and the like, while a service element 104 includes information related to a service that is to be offered. A warranty element 106 includes information related to product warranty, which can be included in the product offer 44.

Figure 3:
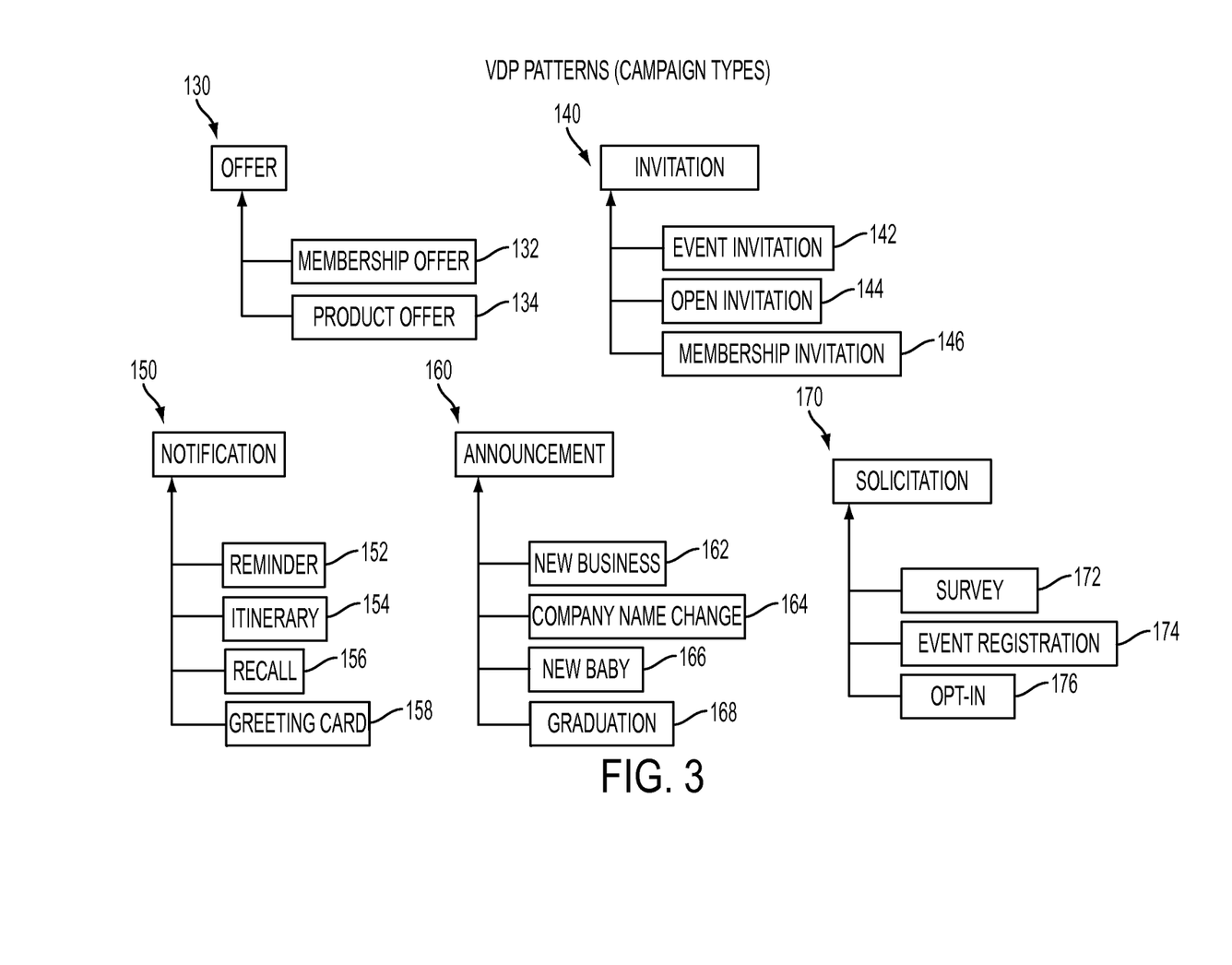
FIG. 3 illustrates a plurality of examples of VDP patterns, such as may be employed in conjunction with various aspects described herein.

FIG. 3 illustrates a plurality of examples of VDP patterns, such as may be employed in conjunction with various aspects described herein. An offer VDP pattern 130 can include, for example, a membership offer 132 and/or a product offer 134. An invitation VDP pattern 140 can include, for example, an event invitation 142, an open invitation 144, and/or a membership invitation 146. A notification VDP pattern 150 may include, for example, a reminder 152, an itinerary 154, a product recall 156, and/or a greeting card 158. An announcement VDP pattern 160 can include, for example, a new business announcement 162, a company name change announcement 164, a new baby announcement 166, and/or a graduation announcement 168. A solicitation VDP pattern 170 can include, for example, a survey 172, an event registration form 174, and/or an opt-in form 176.

Figure 4:
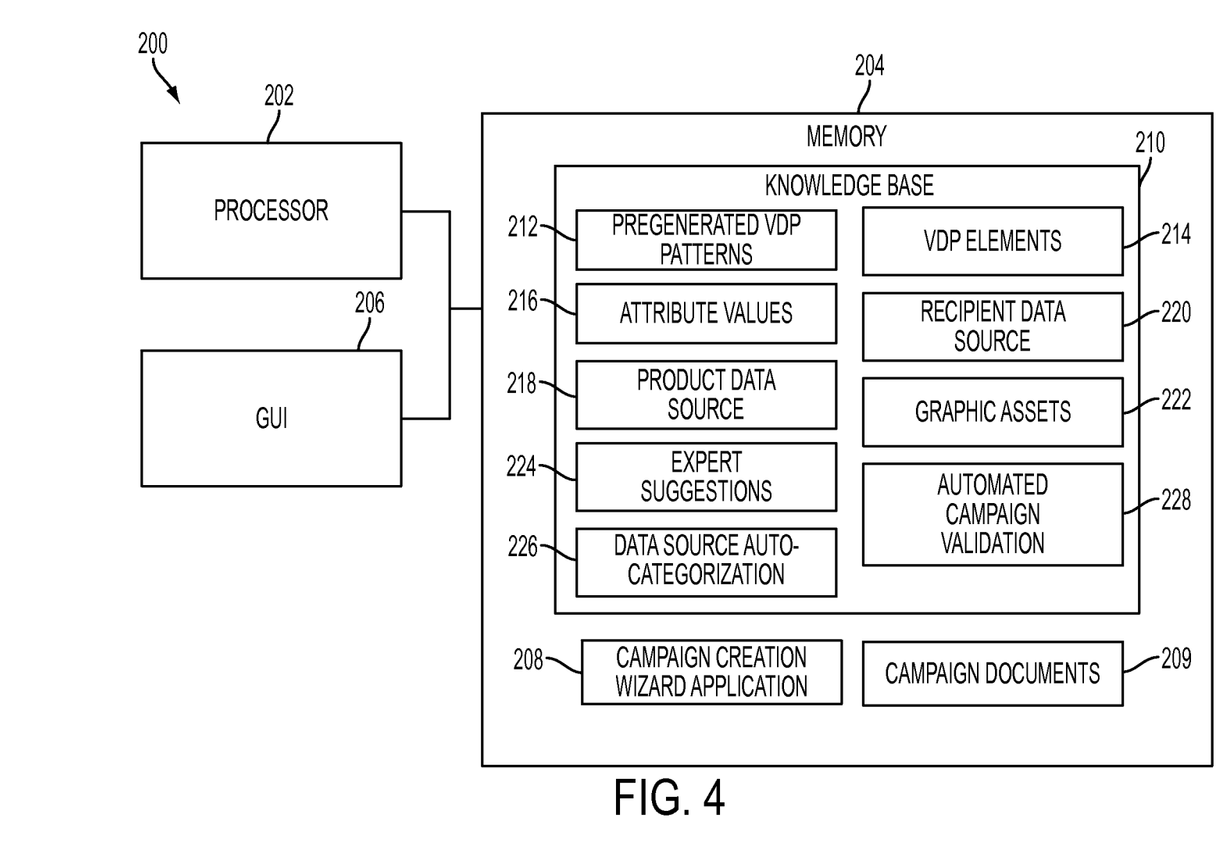
FIG. 4 illustrates a system that facilitates identifying user intent when generating a marketing campaign in order to infer an appropriate VDP pattern and populate the pattern with personalized information, in accordance with one or more aspects described herein.

FIG. 4 illustrates a system 200 that facilitates identifying user intent when generating a marketing campaign in order to infer an appropriate VDP pattern and populate the pattern with personalized information, in accordance with one or more aspects described herein. The system comprises a processor 202 that executes, and a memory 204 that stores computer-executable instructions for performing the various functions, methods, techniques, steps, and the like described herein. The processor 202 and memory 204 may be integral to each other or remote but operably coupled to each other. In another embodiment, the processor and memory reside in a computer (e.g., the computer 30 of FIG. 1). The system further comprises a GUI 206 via which information is presented to the non-expert user (i.e., a layman marketing campaign designer, such as a store or small business owner or the like), and via which the user enters information to the system. The GUI 206 may also be integral to the computer 30.

The memory persistently stores data and computer-executable instructions for performing the described functions, methods, techniques, and the like. For instance, the memory 208 stores a campaign creation wizard module that is executed by the processor to receive information from the user, analyze received information, and output the business logic for a marketing campaign for to the user. In this manner, the wizard module 208 walks the non-expert user through the campaign design process in order to generate the business logic for the marketing campaign that targets the user's customers with personalized campaign documents 209 (e.g., post cards, mailers, emails, web-based ads, or any other suitable campaign media.

As stated above, the system 200 comprises the processor 202 that executes, and the memory 204 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

A knowledge-base 210 (i.e., a computer-readable medium) of VDP patterns 212 is pre-constructed, e.g., by a knowledge engineer, and provided to such a system. The VDP patterns are represented using the vocabulary of the non-expert. Additionally, given a starting knowledge-base, the VDP patterns are also amenable to extension by the campaign designer (non-expert), graphic artist, VDP logic developer, or other campaign developer.

The systems and methods described herein are supported by the wizard module 208, which can accept the campaign designer's desired campaign intent and automatically express and store the campaign intent as one or more instances of VDP patterns 212 and VDP elements 214 (see, e.g., FIGS. 2 and 3). The described systems and methods use an underlying infrastructure to transform the provided instances into initial VDP plan logic that can be used by the logic developer to create the final VDP plan logic. The plan logic incorporates the rules, data schema, and content objects exported to the design. This arrangement also provides the logic developer and/or data specialist with a skeleton of the information expected to be available in the data, and as such can "flag" early on data inconsistencies or shortcomings. Sufficiently simple campaign plan logic could be used to compose the campaign documents without need for a logic developer.

The campaign designer first expresses (e.g., via the GUI 206) the type of VDP campaign they would like to create. This can occur in various ways. For instance, one approach is that all VDP patterns 212 stored in the knowledge-base 210 are presented to the campaign designer for them to choose from. To help select and instantiate a VDP pattern, the campaign designer may be presented with one or more examples in the form of a natural language (NL) sentence. The scope of the natural language used in this embodiment corresponds to the vocabulary of the VDP patterns, which represents the knowledge of the non-expert. Sentence examples may include, without limitation:

I want to send out a promotion to my new health club service.

I want to send out a recall notice for a specific tire model.

I want to send out notifications that a car warranty is expiring.

I want to send out (event) invitations to my family for a 50th wedding anniversary.

I want to up-sell my top customers by offering a variable discount on a new TV on their birthday.

I want to send out an announcement that my business is moving to a new location.

I want to send an (open) invitation for people to join my stamp collecting club.

I want to send out an advertisement to my customers announcing that we carry new finishing butters.

I want to send out customer satisfaction surveys to recent car repair clients.

I want to send personalized holiday greeting cards to all of my friends.

Each VDP pattern 212 is supported by a natural language description that consists of all high-level VDP elements 214 associated with that VDP pattern. The associated VDP elements are "parameterizable" pieces of the NL description. Some examples include:

Product Offer:
 For each recipient, my Product Offer will promote <Product> by offering <Reward> if the recipient takes <Call To Action>, with possible <Restrictions>.

Announcement:
 For each customer, my Announcement will convey new <Information> with the <Benefit> to the customer with a possible <Call To Action>

Event Invitation:
 My Event Invitation will invite each invitee to <Event> at designated <Venue> at a particular <Time> with a desired <Call To Action>, with possible <Restrictions>.

Each VDP element parameter (shown above in brackets < >) is provided as a semantic placeholder for the user to define VDP content. The campaign designer selects the VDP element from the sentence and may then enter any number of options to use as VDP content. For example, a pet store campaign designer selects the <Product> concept and inputs to the system the following product descriptions:

Iams Hairball-Control Cat Food

Flexi Retractable Dog Leash

Habitrail Hamster Habitat

BioCube Aquarium

Each product description is automatically created as a product instance in the knowledge-base of VDP patterns. In cases where multiple values are entered, it is inferred that the VDP element "Product" is variable content, and that a rule is desirable to determine which specific product description to use for each recipient. The campaign designer is then requested to enter the semantics of the data source that will determine the variable content of product for a particular recipient. To further the present example, the campaign designer specifies "pet preference" and assigns data values "cat," "dog," "hamster," and "fish," respectively. The "Product" VDP element in this case is denoted as "variable" in the knowledge base and each instance of the Product is tagged with the data value that is used to select it as variable content.

The data value may be implicit or explicit, and may come from any number of sources. Examples of data value extraction sources include, without limitation: the value may come from a database expert who mines customer purchase history to determine "pet preference'; from a specific pre-existing data field available in a data source; or from automated techniques for determining available data implicit in a given data source.

Continuing the example, the campaign designer selects the <Reward> concept and is offered choices for the type of Reward such as a Frequent-Buyer-Based Discount. The designer may then choose to vary such a discount based on the amount of purchases (e.g., number of purchases, total amount spent on all purchases, etc.) for the past predetermined period (e.g., 12-months). Variable rewards are specified of e.g. "30%", "20%", and "10%" and are offered to customers who have specified "spend level" of values e.g. "over $1000", "between $500 and $1000", and "less than $500" respectively. The Reward VDP element of Product Offer in the knowledge base is then denoted as "variable" and instantiated with these values, as was done for the Product VDP element above.

In a related example, the campaign designer wants the Call To Action element to be the same for all customers. The designer selects the <Call To Action> concept and enters a single value of "Redeem this offer at our store before June $30^{th}$." The Call To Action VDP element in the knowledge base is set to "static" and instantiated with a single value. It will be appreciated that any VDP Pattern can be extended to include additional Promotional Messages, whether they are text or images. One option that the campaign designer may select is to include variable or static Promotional Messages in the VDP document. Continuing with the above pet store example, the campaign designer may provide various sets of graphic assets that they will use to provide an attractive marketing "feel" or aesthetic quality to the campaign document.

In some instances, the designer may desire to reuse the "pet preference" semantic data in which he desires to use imagery from a "cat" graphic asset folder or database when the pet preference is "cat", a "dog" graphic asset folder when the pet preference is "dog," etc. The graphic assets can also be pulled from a content management system that is connected to the wizard application. The designer can also specify variable text messages that include testimonials from cat-owners for the "cat" pet preference, testimonials from dog-owners for the "dog" pet preference, etc.

Once the knowledge base is populated with all desired instances that represent the campaign for a particular VDP pattern, the full instantiation of the campaign is then transformed into a partially-populated or, in some cases, a fully-executable, VDP plan. The transformation automatically creates all the content objects, the logic for determining the variable content, and the data schema needed to support the campaign plan, as well as stores the graphic asset files so they are accessible by the VDP environment. In a specific example in which Xerox's XMPie™ suite is employed, this feature creates an XMPie plan file for the uPlan™ logic definition application.

The VDP elements in the knowledge base may also contain various attributes 216 specific to a given element. For instance, a Product element may have single- and multi-valued attributes such as "price," "image," universal product code or "UPC," etc. In one embodiment, a means for the campaign designer to specify values for the attributes of a VDP element is provided. The attribute values for the element are then made available as content when the corresponding VDP element is selected for a particular dynamic document. In one embodiment, the campaign designer downloads or otherwise generates a product data source 218 (e.g., a list, spreadsheet, or other data source comprising information relating to the products to be included on the campaign documents).

For instance, as the campaign designer is inputting the <Products> for the pet store campaign, he can specify a price and an image of each Product that is to appear on the marketing documents. In one example, upon entering the Product description, the campaign designer indicates a price and image that the product (e.g., a hamster habitat) will have, as associated attribute values. When providing associated values, known values are encoded directly into the knowledge base associated with the <Product> instance. Additionally or alternatively, an attribute value lookup is performed to identify the associated attribute value(s). In another embodiment, the associated value is initially left blank for later value assignment. A VDP element's attributes list may be obtained through various means with the GUI. Entries are made in the knowledge base that capture the campaign intent that the selected attributes represent variable content, as well as whether the selected attributes are graphics or text.

Continuing with the example, the campaign designer specifies known <Product> attribute values using the methods described herein. Table 1 shows examples of product attribute values 216, such as can be extracted from the product data source 218 by the processor 202 when executing the wizard 208, and/or entered directly by the campaign designer.

TABLE 1

| Product | Price | Image | UPC |
| --- | --- | --- | --- |
| Hairball Control Food | $30 | Image1.jpeg | 019014230079 |
| Retractable Dog Leash | $20 | Image2.TIFF | 04718025019 |
| Hamster Habitat | $25 | Image3.GIF | 080605626003 |
| Aquarium | $80 | Image4.PNG | 797926820514 |

The wizard 208 employs campaign intent that may include references to images. It will be appreciated by those of skill that any suitable image type or format may be employed by the subject systems and methods. While Table 1 illustrates four image file formats (jpeg, TIFF, GIF, and PNG), it will be understood that the herein-described systems are not limited thereto.

If the campaign designer desires the recipient's first name to appear on the dynamic document, then the designer indicates that they want the 'firstName' of the recipient to be variable and designate the assignment be to set up by a data specialist. The data specialist and/or logic developer then use this designer-specified campaign intent knowledge to modify the automatically created plan file to extract the appropriate value for the recipient's first name out of a recipient data source 220, which may be provided by the designer (e.g., a spreadsheet comprising a list of the designer's customers or a subset thereof, a database, a comma-delimited list of customers, etc.).

The knowledge base 210 also includes graphic assets 222 (e.g., images, icons, logos, etc.), that the user can select to personalize the campaign documents. Additionally, the expert suggestions are stored in the knowledge base and can be retrieved and presented to the user when the wizard determines that the user's VDP pattern can benefit from automatic suggestions of meaningful actions for the user to take. Additionally, the knowledge base 210 includes a data source auto-categorization module 226 that automatically determines the semantic categories of the data values (e.g., first name, last name, zip code, spend level, pet type, etc.) in each column or row of a downloaded data source. An example of a data source auto-categorization technique that may be employed in conjunction with various aspects described herein is found in U.S. patent application Ser. No. 12/857,997, filed on Aug. 17, 2010 and entitled "*Semantic Classification of Variable Data Campaign Information*," which is hereby incorporated by reference herein in its entirety. An automated campaign validation module 228 continuously or periodically checks the campaign pattern during the design states for errors. If an error is detected, the wizard application prompts the user to correct the errors and walk the user through the corrective actions.

As will be appreciated, personalized campaigns are accomplished through the use of dynamic documents, each of which contains content that is specific and relevant to a particular recipient. The data that drives the dynamic content not only can originate from a recipient data source which contains information about all potential recipients of the campaign, but also from auxiliary non-recipient data sources that contain information not specific to the individual recipients. Examples of non-recipient data sources include data sources describing products, cities, countries, organizations, venues, events, vehicles, etc.

In some cases, these non-recipient data sources may be incomplete or lacking context. In the past, if a data source included a large collection of numbers in a data set that did not have a label or classification associated therewith, the data in such data set was essentially meaningless and not fit for use. The present disclosure, however, sets forth methods and systems that operate to render such formerly meaningless data useful. More specifically, the present disclosure provides for determining the classification of a data set consisting of numbers by using semantic classification techniques on 'nearby' data to identify a context whereby opaque data sets of numbers can be semantically classified inside of that context. An EKB is used to query against the context and determine the semantics of the opaque numeric data sets.

There are generally two approaches to categorization of textual data: corpus-based and knowledge-based. A corpus-based approach uses statistics and clusters to perform inferences on the data being classified. A knowledge-based approach queries upon external knowledge bases to classify the data. The present disclosure utilizes the latter approach.

Encyclopedic knowledge-bases (EKB) semantically capture a wide expanse of knowledge through the use of Linked Data and ontological representations. Semantic mark-up of sites such as Wikipedia provide specific references to content which can be linked together into a RDF Data Model to provide a web of linked data. Additionally, ontologies provide a structured knowledge framework to semantically convey certain meanings on the relationships in the Linked Data; these ontologies include FOAF (Friend of a Friend), SKOS (Simple Knowledge Organization System), DC (Dublin Core), etc. The collection of numerous ontologies such as these is formed into a vast EKB such as DBpedia.

Given a particular data set of words, queries can be posed to EKBs which return a number of different categories and descriptors of the set's entries. Each word in the set is associated with a set of categories and descriptors, then through use of a comparison of similarities among all categories for the data set, the likelihood or confidence can be determined for the semantic classification of the data set as a whole. Example methods for accomplishing this can be found in commonly assigned U.S. patent application Ser. No. 12/858, 168 filed on Aug. 17, 2010. While the foregoing disclosure addresses classification of open class nouns, the present disclosure relates to semantic classification of numbers using EKBs.

In general, the first step in semantic classification of numbers of a data source is to use one of any number of techniques to semantically classify noun-based (non-numerical) data sets in close (or other) proximity to the numerical data set to be classified. Data sets in close proximity include data sets (e.g., columns of data) in the same data table or database. Some ways in which semantic classification of non-numerical data can be accomplished include via the mechanisms described in commonly-assigned U.S. patent application Ser. No. 12/858,168 filed on Aug. 17, 2010, titled a Method for Semantic Classification of a Data Set Consisting of Open Class Nouns, or via a decision tree approach. Once the noun-based data sets are classified, this provides the context in which to classify the numerical data sets.

Each of the classifications of the noun-based data sets is tested against an EKB to determine if that classification and a sample set of data values for the numerical data set are known by the EKB. For the classifications that are known, EKB queries (for instance, using query language SPARQL) are automatically constructed that are designed to return the properties and values for each of the sample set of noun-based (non-numerical) data values. Then, each value retrieved from the EKB queries is compared against a corresponding number value from the numerical data set in the provided data table or database to determine matching values. An acceptable tolerance (such as +/−10%) can be applied in which to consider the number value from the EKB to match the number value in the numerical data set.

Once matching values are determined, a confidence in which the numerical data set conforms to the queried property is derived. The property with a sufficient high confidence (such as over 85%) is determined to be the likely classification of the numerical data set.

Figure 5:
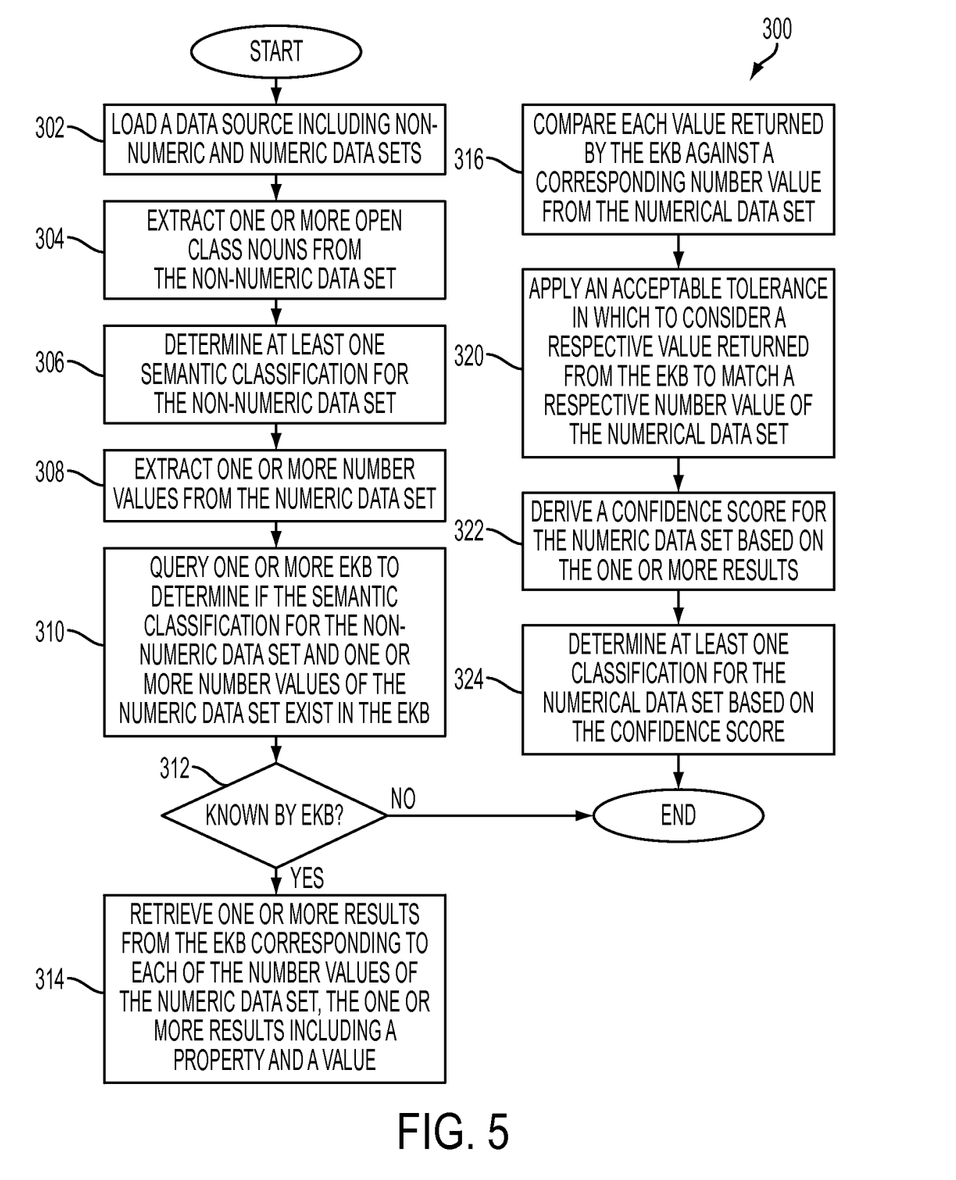
FIG. 5 illustrates a method for classifying non-numerical data in accordance with an aspect of the disclosure.

The foregoing process may be better understood with reference to FIG. 5 wherein an exemplary method 300 in accordance with the disclosure is illustrated. The method 300 begins at process step 302 wherein a data source comprising numeric data and non-numeric data is loaded by a processing device from a computer readable medium operably connected to the processing device. In one example, the data source includes a table or spreadsheet with a plurality of columns of data. Each column can constitute a data set having one or more values. For example, and with further reference to FIG. 6, a data source in the form of table T is illustrated including columns A through F. Columns A, B and F are examples of non-numerical data sets, while columns C, D and E are examples of numerical data sets.

Returning to FIG. 5, in process step 304 one or more open class nouns are extracted from the non-numerical data sets. (for example, the words Ottawa, Olso, Mexico etc. from column A of Table T in FIG. 6.) In process step 306, at least one semantic classification is determined for the non-numeric data set. This can be performed by any suitable method, such as the methods referred to previously. In Table T of FIG. 6, column A would be classified as "Cities", column B would be classified as "Countries" and column F would be classified as "Web Sites".

In process step 308, one or more number values from the numeric data sets are extracted by the processing device. Then, in process step 310, a query is generated and submitted to an EKB to determine if the semantic classification for the non-numerical data set and one or more number values of the numerical data set exist in the EKB. This ensures that the EKB contains at least some relevant information before further querying of the EKB is performed.

In process step 312, a determination is made whether the EKB "knows" the information relevant to the data source. If the determination is negative, the process may end. In another exemplary embodiment, if the determination is negative the process could be configured to query a different EKB until an EKB including relevant information is located, or until all EKBs of a list have been queried.

If the determination is positive, then the EKB is again queried in process step 314 based on the at least one semantic classification of the non-numeric data set and one or more number values of the numeric data set to retrieve one or more results corresponding to each of the number values of the numeric data set, the one or more results including a property and a value. An example query may be the following SPARQL query to retrieve the properties and values of Oslo:

```
SELECT ?property ?hasValue ?isValueOf
    WHERE {
        { <http://dbpedia.org/resource/Oslo> ?property ?hasValue }
          UNION
        { ?isValueOf ?property <http://dbpedia.org/resource/Oslo> }
    }
```

Figure 7:
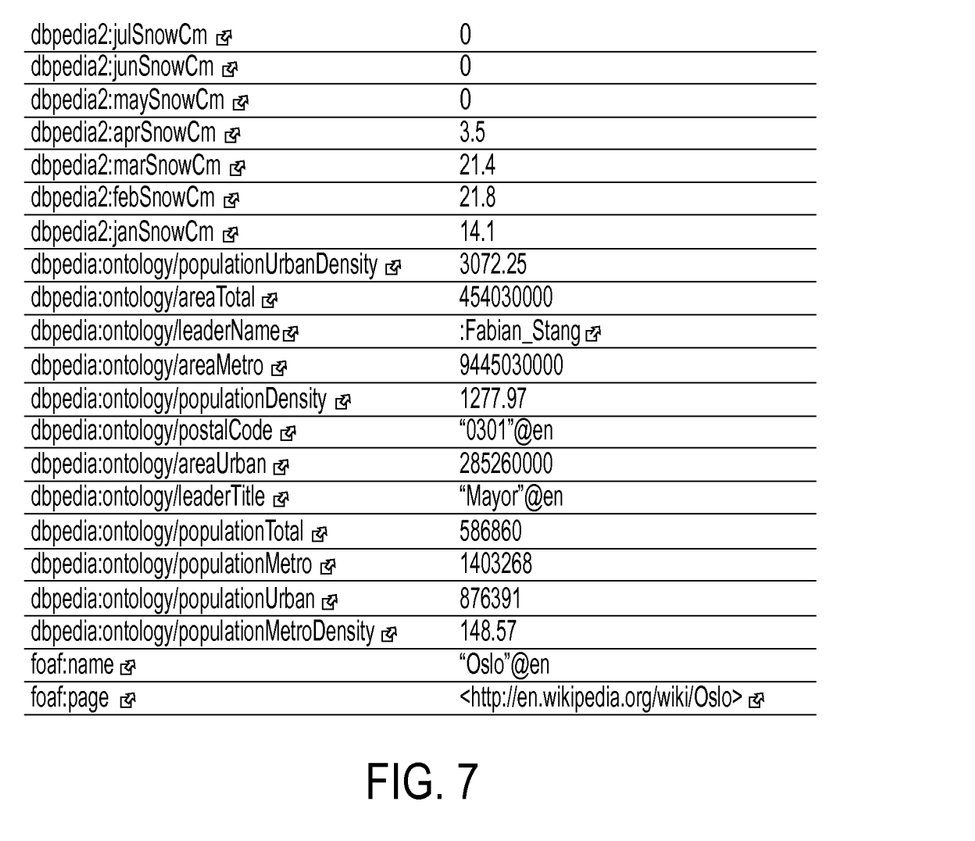
FIG. 7 is a screenshot of an exemplary results set returned by an EKB in accordance with an aspect of the disclosure.

A partial results set for the foregoing SPARQL query is shown in FIG. 7 wherein a large amount of information relating to Oslo is returned. As will be appreciated, the results set includes both a property and a value. Examples of properties returned include snowfall amounts for various months, population density, area total, leader name, population total, population metro, etc. These results were all returned from the EKB because they relate to the city Olso.

Returning to FIG. 5, the process continues to process step 316 where each value of the results set returned by the EKB is compared against a corresponding number value from the numerical data set. For example, and with further reference to FIGS. 6 and 7, the value associated with property "populationMetro" of 1403268 is compared to the number values in table T. Of course, this is just a single example and all values returned from the EKB can be compared to all number values in the data source as desired. The purpose of comparing the values returned from the EKB to the number values of the data set is to find matching numbers such that the property associated with the value returned from the EKB can be assigned to the data set containing the numeric value.

As will be appreciated, direct matches between the numeric values of the data set and the returned values may be relatively rare and thus it may be useful to apply an acceptable tolerance in which to consider a respective value returned from the EKB to match a respective number value of the numerical data set. For example, +/−10 percent of the returned value is one example of an acceptable tolerance.

Accordingly, in process step 320 the acceptable tolerance is applied in which to consider values to be matches. This tolerance can be different based on the property value of the returned result, or can be a standard tolerance applied to all property values. Then, in process step 322, a confidence score is derived based on the one or more matching results. For example, if each numeric value in column C is matched with a "populationMetro" property value of its corresponding city in column A, then confidence may be high that column C is in fact metropolitan population. Finally, in process step 324, a classification for the numerical data set is assigned or otherwise set based on the confidence score.

Figure 6:
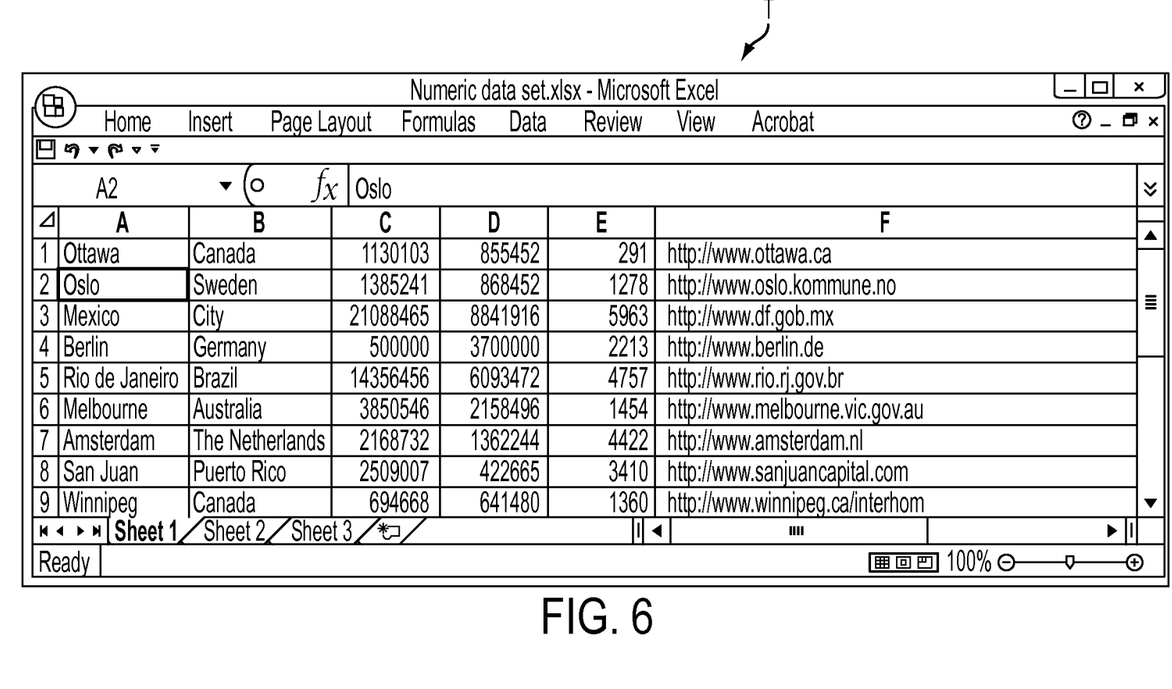
FIG. 6 is a screenshot of an exemplary data source that can be used in the method of FIG. 5.

Returning to the example, and using the +/−10 percent tolerance, a comparison of property values returned by the EKB with numeric values of the data sets show that the EKB property value "populationMetro" is within the provided tolerance +/−10% of the corresponding data set value in Column C for Oslo. Although not illustrated, subsequent queries of other cities (the values in data set of Column A) also correspond well for the numeric values in Column C with the property "populationMetro". Similarly, there is high correspondence between the data set of Column D with the EKB property "populationUrban". Additionally, a high correspondence is noted between the data set of Column E with the EKB property "populationDensity". Queries are also formed with the data in the sample set for "Countries" (Column B), but no numeric value results are within tolerance. Finally, queries formed with the data in "Web Sites" (Column F) return only 3 properties with no values that are numeric, so the web sites results are ignored.

The resulting semantic classifications that returned the high confidence are, as previously stated, "populationMetro" for data set of Column C, "populationUrban" for data set of Column D, and "populationDensity" for data set of Column E.

Although the foregoing example relates to numbers, it will be appreciated, that EKBs can also contain "numeric like" entries, such as property 'postalCode' with a value of "0301" for Oslo in the example above. This can be a side effect of the approaches used to create the EKBs from human input, such as creating the DBpedia from Wikipedia, for example. The method described herein could also incorporate heuristics or rules that transform values like "0301" into a numeric value 0301 or 301. While postal code is a common semantic class for which other classification methods exist, it is an example of how exact matches to numeric data can provide useful results, especially in the cases when they are not comprehended by a specialized categorization system.

It will also be appreciated that a supporting knowledge-base of known categories could be provided to assist in the determination of acceptable tolerances when given the semantics of a particular category. For instance, the supporting knowledge-base could have knowledge such as a country's GDP changes frequently. This information could be used to increase the tolerance applied to, for example, +/−15%. In another instance, the knowledge could be that a population changes slowly and therefore a tolerance test of +/−5% should be used, or a zip code changes rarely and non-contiguously and therefore a tolerance test of 0% should be employed. A learning algorithm may be used to further refine the tolerances applied to each category. After a category for a numerical data set is discovered by the technique described herein, the learning algorithm would subsequently query the EKB on a regular basis (daily, weekly, monthly, etc.) to compare the newer numerical data with the old. A calculation is then used to determine the change frequency of the numerical data in the EKB and this change frequency is then used to further refine the accuracy of the tolerance that is used for the given semantic category.

Aspects of the disclosed system and method can also be extended to specialized EKBs and any other semantically-based knowledge-base. Product KBs for goods and services are emerging on the web of linked data, whereby the same technique described can be used to categorize product data tables and databases. For example, if it is determined that a table of data corresponds to a product such as Vehicle, the product ontology used by the product linked data base could be inspected to extract Vehicle numeric properties. Such a property could be used to retrieve numeric data from the product linked data base that could then be compared to the data in the table to determine the semantic classification of a data set, e.g., Vehicle weight.

As will be appreciated, the forgoing methods can be performed by, for example, the processor 202 of system 200 described in connection with FIG. 4. In an embodiment, the campaign creation wizard application 208 can include the instructions for carrying out the disclosed method. Of course, it will also be appreciated that aspects of this disclosure can be implemented by other types of systems as desired.

Although the above disclosure relates to VDP campaign creation and the like, it should be understood that aspects of the disclosure are applicable to virtually any situation wherein opaque numeric data is located.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of semantically classifying numeric data of a data source including numeric data sets and non-numeric data sets, the method comprising:
loading, by a processing device, a data source comprising numeric data and non-numeric data;
extracting, by the processing device, one or more open class nouns from at least one non-numeric data set of the data source, the one or more open class nouns being in a proximity to the numeric data set of the data source;
determining, by the processing device, at least one semantic classification for the non-numeric data set of the data source using a semantic classification technique;
extracting, by the processing device, one or more number values from at least one numeric data set of the data source;
querying, by the processing device, an EKB to determine if the semantic classification for the non-numeric data set and one or more number values of the numeric data set exist in the EKB and, if so, querying the EKB based on the at least one semantic classification of the non-numeric data set and one or more number values of the numeric data set to retrieve one or more results corresponding to each of the number values of the numeric data set, the one or more results including a property and a value;
comparing, by the processing device, each value returned by the EKB against a corresponding number value from the numerical data set;
applying an acceptable tolerance in which to consider a respective value returned from the EKB to match a respective number value of the numerical data set,
deriving, by the processing device, a confidence score for the numeric data set based on the one or more results; and
determining, by the processing device, at least one classification for the numerical data set based on the confidence score.

2. The method of claim 1, further comprising:
analyzing the one or more classifications for each open class noun in the data set based upon the one or more results; and
determining the confidence score based upon a combination of the one or more classifications for each open class noun.

3. The method of claim 1, wherein the data source includes columns of data, and the extracting one or more open class nouns from the non-numeric data set of the data source includes extracting an entire column of non-numeric data from the data source.

4. The method of claim 1, wherein the data source includes columns of data, and the extracting one or more number values from the numeric data set of the data source includes extracting an entire column of numeric data from the data source.

5. The method of claim 1, wherein the data source includes at least one of product information, geographical information, climate information, or business information.

6. The method as set forth in claim 1, wherein the data source includes a plurality of columns of data with each column representing a data set, at least one of the columns containing non-numeric data, and at least one of the columns including numeric data.

7. The method as set forth in claim 1, wherein the non-numerical data set and the numerical data set are in proximity if the data sets are within the same data source.

8. The method as set forth in claim 7, wherein the non-numerical data set and the numerical data set are in proximity if the data sets are adjacent within the data source.

9. The method as set forth in claim 1, further comprising utilizing the least one classification for the numerical data set to semantically classify additional numeric data sets.

10. A processor configured to execute computer-executable instructions for performing the method of claim 1, the instructions being stored on a non-transitory computer-readable medium.

11. A system that semantically classifies numeric data of a data source including numeric data sets and non-numeric data sets, comprising:
a processing device; and
a non-transitory computer readable medium in communication with the processing device,
wherein the non-transitory computer readable medium comprises one or more programming instructions that, when executed, cause the processing device to:
load a data source comprising numeric data and non-numeric data;
extract one or more open class nouns from at least one non-numeric data set of the data source, the one or more open class nouns being in a proximity to the numeric data set of the data source;
determine at least one semantic classification for the non-numeric data set of the data source using a semantic classification technique;
extract one or more number values from at least one numeric data set of the data source;
query an EKB to determine if the semantic classification for the non-numeric data set and one or more number values of the numeric data set exist in the EKB and, if so, query the EKB based on the at least one semantic classification of the non-numeric data set and one or more number values of the numeric data set to retrieve one or more results corresponding to each of the number values of the numeric data set, the one or more results including a property and a value;
compare each value returned by the EKB against a corresponding number value from the numerical data set;
apply an acceptable tolerance in which to consider a respective value returned from the EKB to match a respective number value of the numerical data set;
derive a confidence score for the numeric data set based on the one or more results; and
determine at least one classification for the numerical data set based on the confidence score.

12. The system of claim 11, wherein the one or more programming instructions for deriving the confidence score further comprise one or more programming instruction that, when executed, cause the processing device to:
analyze the one or more classifications for each numeric value in the data set based upon the one or more results; and
determine the confidence score for the numeric data set based upon a combination of the one or more classifications for each numeric value.

13. The system of claim 11, wherein the data source includes at least one of product information, geographical information, climate information, or business information.

14. The system of claim 11, wherein the data source includes at least one of a database, a spreadsheet, or a linked list.

15. A method of semantically classifying a data set of numeric values contained in a data source having at least one non-numeric data set comprising:
loading, by a processing device, a non-numeric data set comprising one or more non-numeric values;
processing, by the processing device, the non-numeric data set to determine one or more classifications of the non-numeric data set;
extracting, by the processing device, the numeric data set;
querying, by the processing device, at least on EKB to determine if the one or more classifications and at least one numeric value of the numeric data set are known to the EKB and, if so, querying, by the processing device, the EKB for all data relating to the numeric values of the numeric data set;
receiving, by the processing device, from the EKB at least a property and a value associated with each numeric value of the numeric data set; and
determining, by the processing device at least one classification for the numeric data set based on at least a property received from the EKB.

16. The method of claim 15, further comprising applying an acceptable tolerance in which to consider a value of the EKB to match a numeric value of the numerical value set.

17. The method of claim 16, wherein the acceptable tolerance is within plus or minus 10% of the numeric value.

18. The method of claim 15, wherein the determining includes at least one of deriving a confidence score based upon a combination of one or more classifications of the non-numerical data set and numerical data set, and deriving a confidence score using a learning algorithm to determine the best confidence score for each type of classification.

19. The method of claim 15, wherein the data source includes at least one of product information, geographical information, climate information, or business information.

20. A processor configured to execute computer-executable instructions for performing the method of claim 15, the instructions being stored on a non-transitory computer-readable medium.

* * * * *